US012060835B2

(12) United States Patent
Martin

(10) Patent No.: US 12,060,835 B2
(45) Date of Patent: Aug. 13, 2024

(54) LATERALLY BIASED SYSTEM FOR MOUNTING AUXILIARY COMPONENTS TO GAS TURBINE ENGINES

(71) Applicant: RAYTHEON TECHNOLOGIES CORPORATION, Farmington, CT (US)

(72) Inventor: Octavio Martin, Broad Brook, CT (US)

(73) Assignee: RTX CORPORATION, Farmington, CT (US)

( * ) Notice: Subject to any disclaimer, the term of this patent is extended or adjusted under 35 U.S.C. 154(b) by 184 days.

(21) Appl. No.: 17/830,228

(22) Filed: Jun. 1, 2022

(65) Prior Publication Data

US 2023/0054275 A1     Feb. 23, 2023

Related U.S. Application Data

(60) Provisional application No. 63/235,481, filed on Aug. 20, 2021.

(51) Int. Cl.
*F02C 7/32*     (2006.01)
*F01D 25/28*     (2006.01)

(52) U.S. Cl.
CPC ............... *F02C 7/32* (2013.01); *F01D 25/28* (2013.01); *F05D 2240/14* (2013.01); *F05D 2260/311* (2013.01); *F05D 2260/4031* (2013.01)

(58) Field of Classification Search
CPC ........ F02C 7/32; F01D 25/28; F05D 2240/14; F05D 2260/311; F05D 2260/40311
See application file for complete search history.

(56) References Cited

U.S. PATENT DOCUMENTS

| | | | |
|---|---|---|---|
| 6,170,252 B1 * | 1/2001 | Van Duyn | F01D 21/04 60/226.1 |
| 7,093,996 B2 | 8/2006 | Wallace et al. | |
| 8,104,736 B2 | 1/2012 | Callaghan | |
| 8,814,462 B2 | 8/2014 | Care | |
| 8,943,840 B2 * | 2/2015 | Williams | F02C 7/32 60/797 |
| 9,046,041 B2 | 6/2015 | Rejman et al. | |

(Continued)

FOREIGN PATENT DOCUMENTS

| | | |
|---|---|---|
| EP | 1473441 | 6/2000 |
| EP | 1010879 | 11/2004 |

(Continued)

OTHER PUBLICATIONS

USPTO; Non-Final Office Action dated Nov. 15, 2022 in U.S. Appl. No. 17/408,138.

(Continued)

*Primary Examiner* — Brian Christopher Delrue
*Assistant Examiner* — Joshua R Beebe
(74) *Attorney, Agent, or Firm* — SNELL & WILMER L.L.P.

(57) ABSTRACT

A mounting assembly for mounting an auxiliary component to an engine case of a gas turbine engine includes a first flange configured for attaching the mounting assembly to the engine case; a second flange configured for attaching the mounting assembly to the auxiliary component; and a mechanical fuse disposed between the first flange and the second flange and configured to shear during an overload event.

13 Claims, 5 Drawing Sheets

(56) References Cited

U.S. PATENT DOCUMENTS

| | | | |
|---|---|---|---|
| 9,982,605 B2 * | 5/2018 | Robertson | F01D 21/045 |
| 10,215,100 B2 | 2/2019 | Jiang et al. | |
| 10,247,038 B2 | 4/2019 | Kappes et al. | |
| 10,578,204 B2 | 3/2020 | Martin | |
| 11,015,698 B2 | 5/2021 | Jiang et al. | |
| 2007/0125087 A1 * | 6/2007 | Callaghan | F02C 7/32 60/772 |
| 2013/0042630 A1 * | 2/2013 | Muldoon | F02C 7/32 60/796 |
| 2014/0084130 A1 | 3/2014 | Rejman et al. | |
| 2014/0314546 A1 | 10/2014 | Davis et al. | |
| 2016/0017811 A1 | 1/2016 | Martin | |
| 2017/0260907 A1 * | 9/2017 | Jiang | F16H 57/025 |
| 2017/0260908 A1 * | 9/2017 | Jiang | F16H 57/028 |
| 2017/0260909 A1 | 9/2017 | Jiang et al. | |
| 2017/0260910 A1 | 9/2017 | Jiang et al. | |
| 2018/0058568 A1 * | 3/2018 | Martin | F16H 57/025 |

FOREIGN PATENT DOCUMENTS

| | | |
|---|---|---|
| EP | 3219961 | 9/2017 |
| EP | 3219963 | 9/2017 |
| EP | 3287624 | 2/2018 |
| EP | 3633164 | 4/2020 |
| WO | 2007064388 | 6/2007 |
| WO | 2014100817 | 6/2014 |
| WO | 2014137575 | 9/2014 |

OTHER PUBLICATIONS

European Patent Office, European Search Report dated Mar. 13, 2023 in Application No. 22198170.7.

USPTO; Notice of Allowance dated Jun. 6, 2023 in U.S. Appl. No. 17/408,138.

USPTO; Office Action dated Sep. 16, 2022 in U.S. Appl. No. 17/492,417.

European Patent Office, European Search Report dated Jan. 10, 2023 in Application No. 22188794.6.

European Patent Office, European Search Report dated Jan. 10, 2023 in Application No. 2218889.4.

USPTO; Notice of Allowance dated Jan. 26, 2023 in U.S. Appl. No. 17/492,417.

USPTO; Corrected Notice of Allowance dated Feb. 17, 2023 in U.S. Appl. No. 17/492,418.

* cited by examiner

LATERALLY BIASED SYSTEM FOR MOUNTING AUXILIARY COMPONENTS TO GAS TURBINE ENGINES

CROSS-REFERENCE TO RELATED APPLICATIONS

This application claims priority to, and the benefit of, U.S. Provisional Application No. 63/235,481, filed Aug. 20, 2021, and titled "LATERALLY BIASED SYSTEM FOR MOUNTING AUXILIARY COMPONENTS TO GAS TURBINE ENGINES," which is incorporated by reference herein in its entirety for all purposes.

FIELD

The present disclosure relates generally to gas turbine engines and, more particularly, to auxiliary component mounting systems for gas turbine engines.

BACKGROUND

Gas turbine engines typically utilize a turbine fan to draw ambient air into the engine for compression and combustion by the engine. The turbine fan is shrouded by an engine casing. Various auxiliary components, such as electrical boxes, engine oil tanks, gearboxes, valves, control systems for regulating engine operations, and other components, are mounted to the engine casing. Various mounting systems mount the auxiliary components to the engine casing.

Conventional mounting systems may become subjected to a high degree of shock loading not experienced during normal engine operating conditions. For example, a high shock load may result from a fan blade out event, which occurs when a fan blade breaks off of an engine rotor body. A fan-blade out event may also result in an imbalance in the engine rotor body which may cause outward deflection and a rotor body shaft imbalance. The mounting system may not be able to withstand the high shock load of a fan blade out event, causing separation of the auxiliary components from the engine casing. Or, the mounting system may transfer the high shock load to the auxiliary components, causing damage to the auxiliary components.

Auxiliary components of particular concern include the gearboxes used to drive other components of the gas turbine engine. As part of an aircraft engine design, gearboxes are subjected to competing criteria. For example, on one hand, it may be desirable to use light-weight materials as part of the gearbox hardware in order to reduce aircraft weight. On the other hand, the gearbox materials must be sufficiently strong and durable in order to withstand various loads. Fan blade out (FBO) loads are often the limiting factor as part of a conventional gearbox design. A FBO may result in large rotor imbalance loads based on a fan blade becoming detached from a fan hub or rotor. As part of gearbox designs, mechanical fuses may be incorporated into the gearbox mounting systems. Such mechanical fuses may alleviate the need to otherwise over-design the gearbox hardware to withstand such rotor imbalance loads and to protect against a FBO event.

SUMMARY

A mounting assembly for mounting an auxiliary component to an engine case of a gas turbine engine, the engine case extending along an axial direction with respect to a central rotational axis of the gas turbine engine, is disclosed. In various embodiments, the mounting assembly includes a first flange configured for attaching the mounting assembly to the engine case; a second flange configured for attaching the mounting assembly to the auxiliary component; and a mechanical fuse disposed between the first flange and the second flange and configured to shear during an overload event. In various embodiments, the mechanical fuse is configured to shear in reaction to a load applied in a lateral direction. In various embodiments, the lateral direction is a circumferential direction with respect to the axial direction.

In various embodiments, the mechanical fuse includes a center portion connected to the second flange and extending away from the second flange and toward the first flange. In various embodiments, the center portion defines a rectangular block bounded by a first lateral side and a second lateral side. In various embodiments, the mechanical fuse includes a first fuse member spaced a first lateral distance from the first lateral side. In various embodiments, the mechanical fuse includes a second fuse member spaced a second lateral distance from the second lateral side.

In various embodiments, the mechanical fuse includes a first wall member connected to the first flange and extending away from the first flange and toward the second flange, the first wall member configured to abut the first fuse member. In various embodiments, the mechanical fuse includes a second wall member connected to the first flange and extending away from the first flange and toward the second flange, the second wall member configured to abut the second fuse member.

In various embodiments, the first fuse member includes a first fuse section, the first fuse section being formed by a first lateral gap positioned proximate a first base portion that is connected to the first fuse member. In various embodiments, the second fuse member includes a second fuse section, the second fuse section being formed by a second lateral gap positioned proximate a second base portion that is connected to the second fuse member.

In various embodiments, a first boss is connected to the first flange and configured to be received in a first recess portion of a plate attached to the engine case. In various embodiments, a second boss is connected to the second flange and configured to be received in a second recess portion extending into the auxiliary component.

A gas turbine engine is disclosed. In various embodiments, the gas turbine engine includes an engine case, the engine case including a plate for mounting a gearbox; and a mounting assembly for mounting the gearbox to the engine case, the engine case extending along an axial direction with respect to a central rotational axis of the gas turbine engine, the mounting assembly including a first flange configured for attaching the mounting assembly to the engine case, a second flange configured for attaching the mounting assembly to the gearbox, and a mechanical fuse disposed between the first flange and the second flange and configured to shear during an overload event. In various embodiments, the mechanical fuse is configured to shear in reaction to a load applied in a lateral direction, the lateral direction being a circumferential direction with respect to the axial direction.

In various embodiments, the mechanical fuse includes a center portion connected to the second flange and extending away from the second flange and toward the first flange, the center portion defining a rectangular block bounded by a first lateral side and a second lateral side. In various embodiments, the mechanical fuse includes a first fuse member spaced a first lateral distance from the first lateral side and a second fuse member spaced a second lateral distance from the second lateral side.

In various embodiments, the mechanical fuse includes a first wall member connected to the first flange and extending away from the first flange and toward the second flange, the first wall member configured to abut the first fuse member, and a second wall member connected to the first flange and extending away from the first flange and toward the second flange, the second wall member configured to abut the second fuse member.

In various embodiments, the first fuse member includes a first fuse section, the first fuse section being formed by a first lateral gap positioned proximate a first base portion that is connected to the first fuse member, and a second fuse section, the second fuse section being formed by a second lateral gap positioned proximate a second base portion that is connected to the second fuse member.

In various embodiments, a first boss is connected to the first flange and configured to be received in a first recess portion of the plate attached to the engine case, and a second boss is connected to the second flange and configured to be received in a second recess portion extending into the gearbox.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
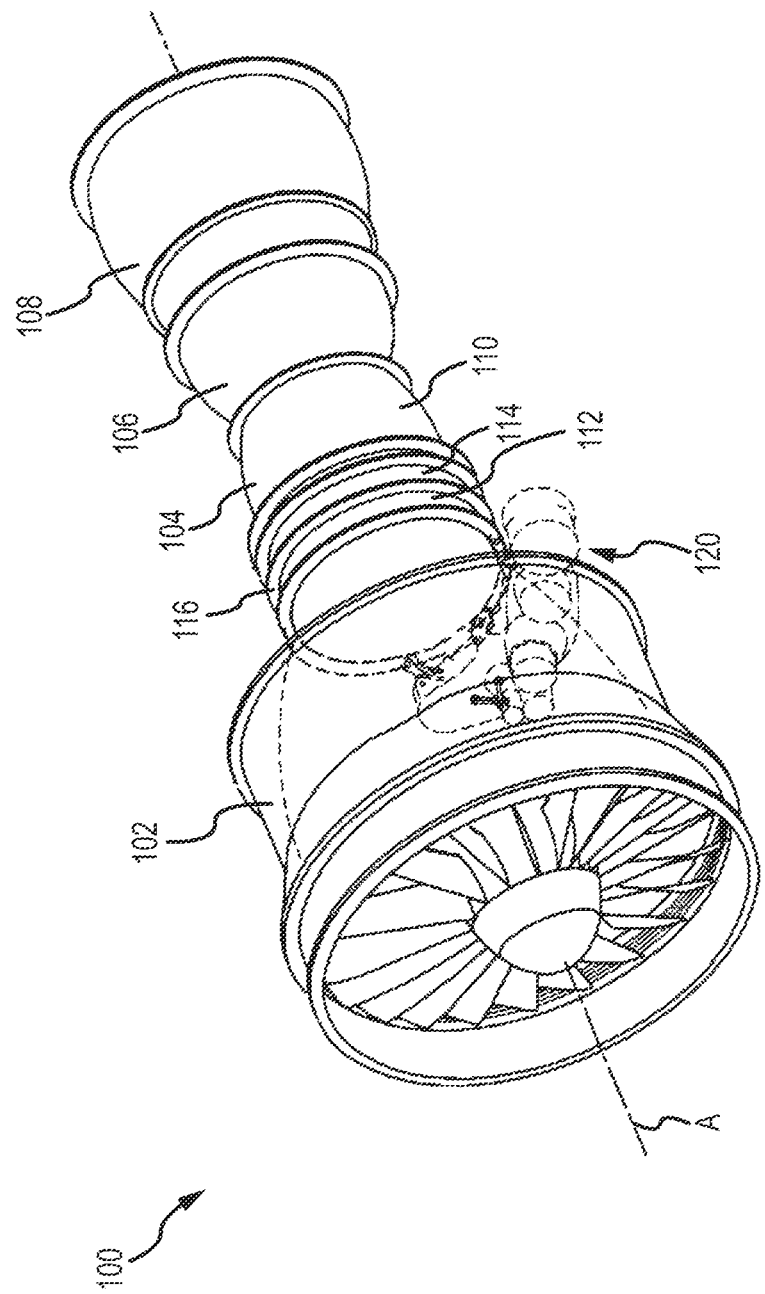
FIG. 1A provides a schematic perspective view of a gas turbine engine having a gearbox mounted to an external engine case of the gas turbine engine, in accordance with various embodiments.
Figure 1B:
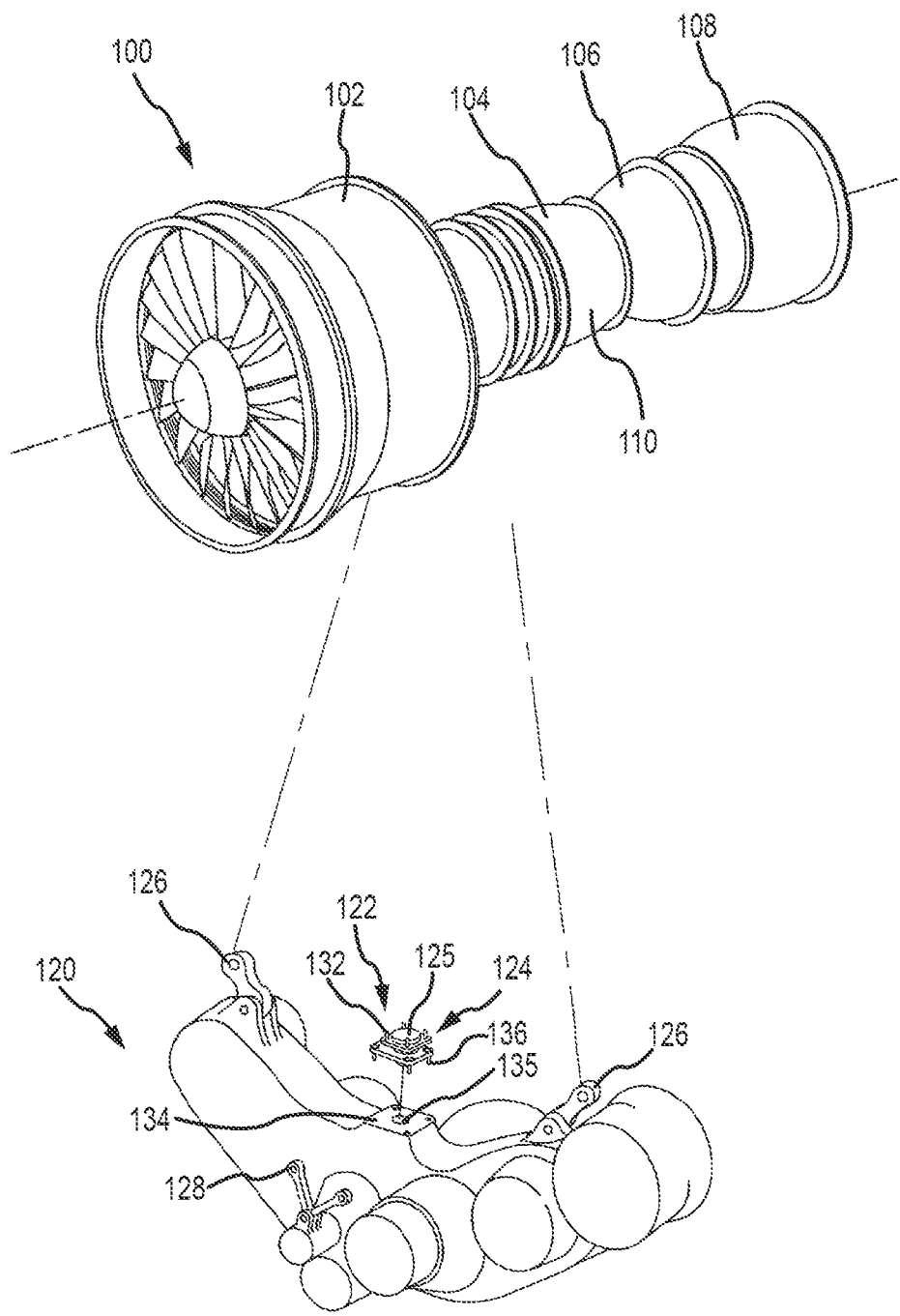
FIGS. 1B and 1C provide a schematic exploded view of the gas turbine engine shown in FIG. 1A and a mounting assembly for mounting the gearbox to the external engine case of the gas turbine engine and a schematic radial view of a portion of the external engine case having a mounting plate configured to receive a boss of the mounting assembly, in accordance with various embodiments.
Figure 1C:
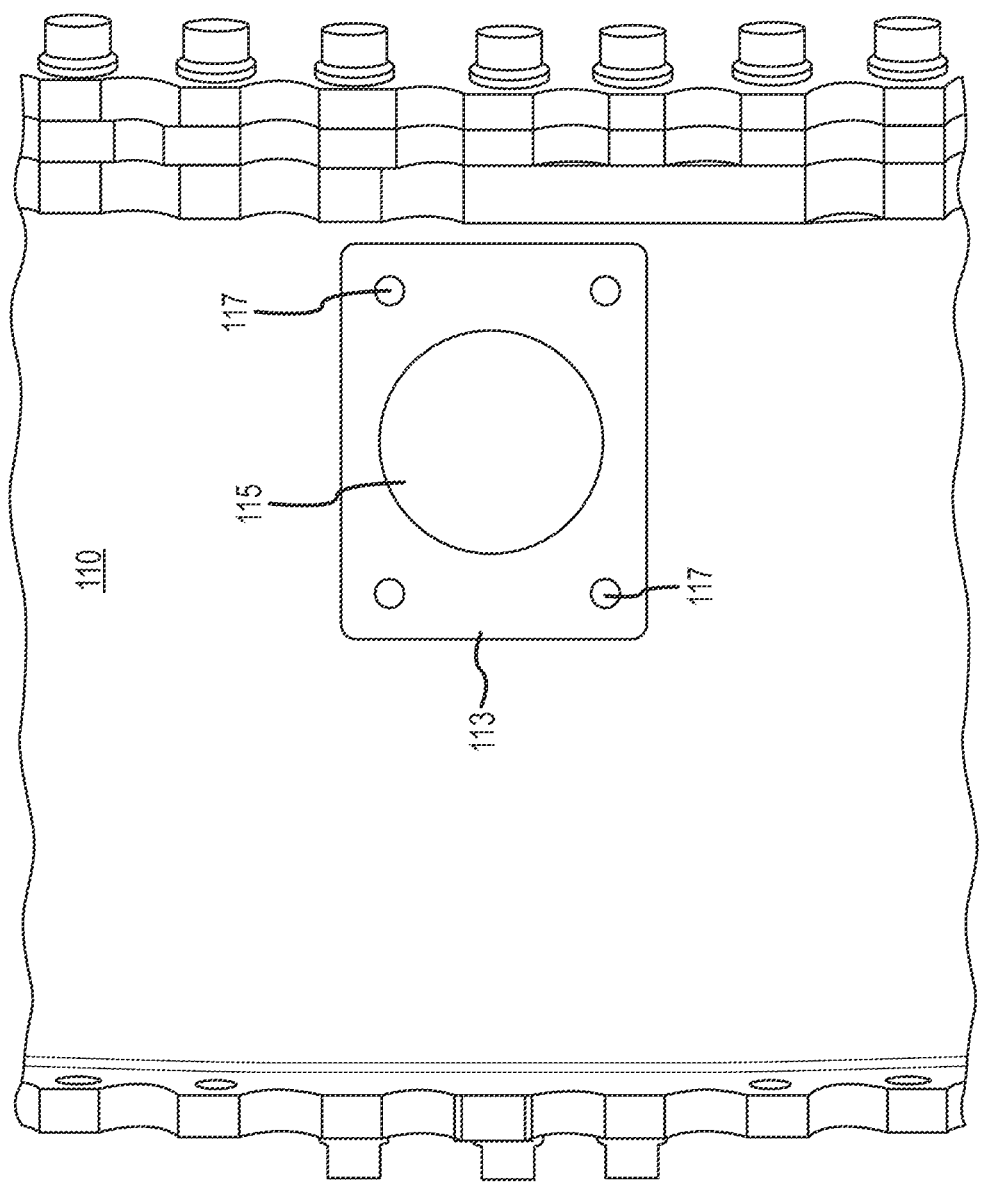

Referring now to the drawings, FIGS. 1A and 1B schematically illustrate a gas turbine engine 100, in accordance with various embodiments. The gas turbine engine 100 includes a fan section 102, a compressor section 104, a combustor section 106 and a turbine section 108. Typically, the compressor section 104 and the turbine section 108 each contain one or more stages that rotate about a central rotational axis A. An engine case 110 serves as a main structural support for the gas turbine engine 100 and surrounds each of the compressor section 104, the combustor section 106 and the turbine section 108. In various embodiments, the engine case 110 is constructed of individual case sections, such as a first case section 112 and a second case section 114, that are joined together at bolted flanges, such as, for example, flange 116. A gearbox 120 (or, more generally, an auxiliary component) is illustrated as being mounted to a forward end of the engine case 110 proximate the compressor section 104. Referring more particularly to FIGS. 1B and 1C, the gearbox 120 is mounted to the engine case 110 via a mounting assembly 122 having a mechanical fuse 124 configured to fracture during the occurrence of an overload event. In various embodiments, the engine case 110 includes a mounting plate 113 that extends radially outward from the engine case 110. The mounting plate 113 includes a first recess portion 115 configured to receive a first boss 125 that is attached to the mounting assembly 122. The mounting plate 113 also includes a first plurality of threaded apertures 117 configured to receive a first plurality of bolts 132 (e.g., the first plurality of bolts 232 illustrated in FIGS. 2A and 2B) for securing the mounting assembly 122 to the engine case 110. Similarly, the gearbox 120 includes a second plurality of threaded apertures 134 configured to receive a second plurality of bolts 132 (e.g., the second plurality of bolts 236 illustrated in FIGS. 2A and 2B) for securing the mounting assembly 122 to the gearbox 120. The gearbox 120 also includes a second recess portion 135 configured to receive a second boss (e.g., the second boss 337 illustrated in FIG. 3) that is attached to the mounting assembly 122. In various embodiments, one or more side links 126 and a forward link 128 may also be used to mount the gearbox 120 to the engine case 110.

Figure 2A:
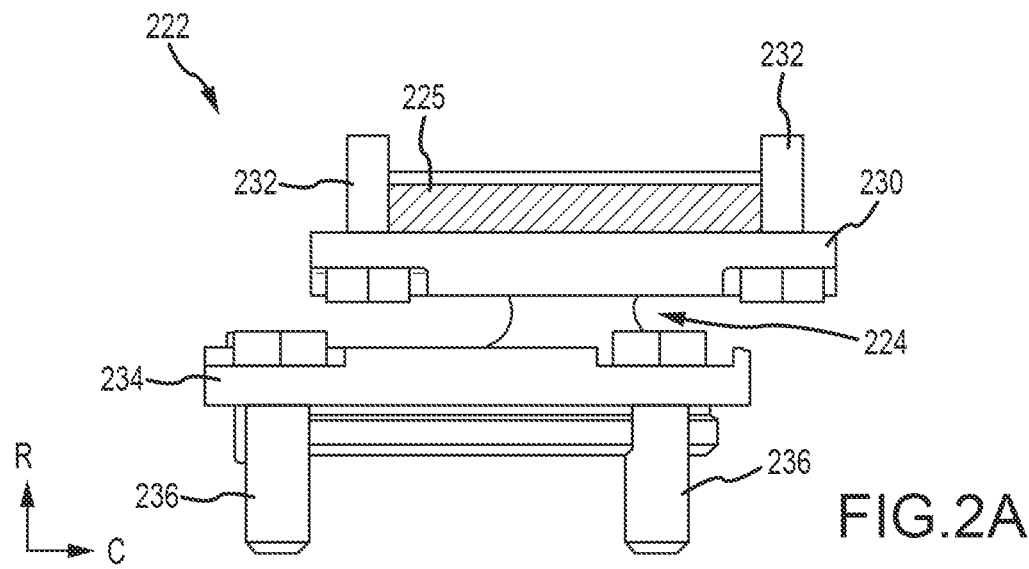
FIGS. 2A and 2B provide schematic side and overhead views of a mounting assembly having a mechanical fuse, in accordance with various embodiments.
Figure 2B:
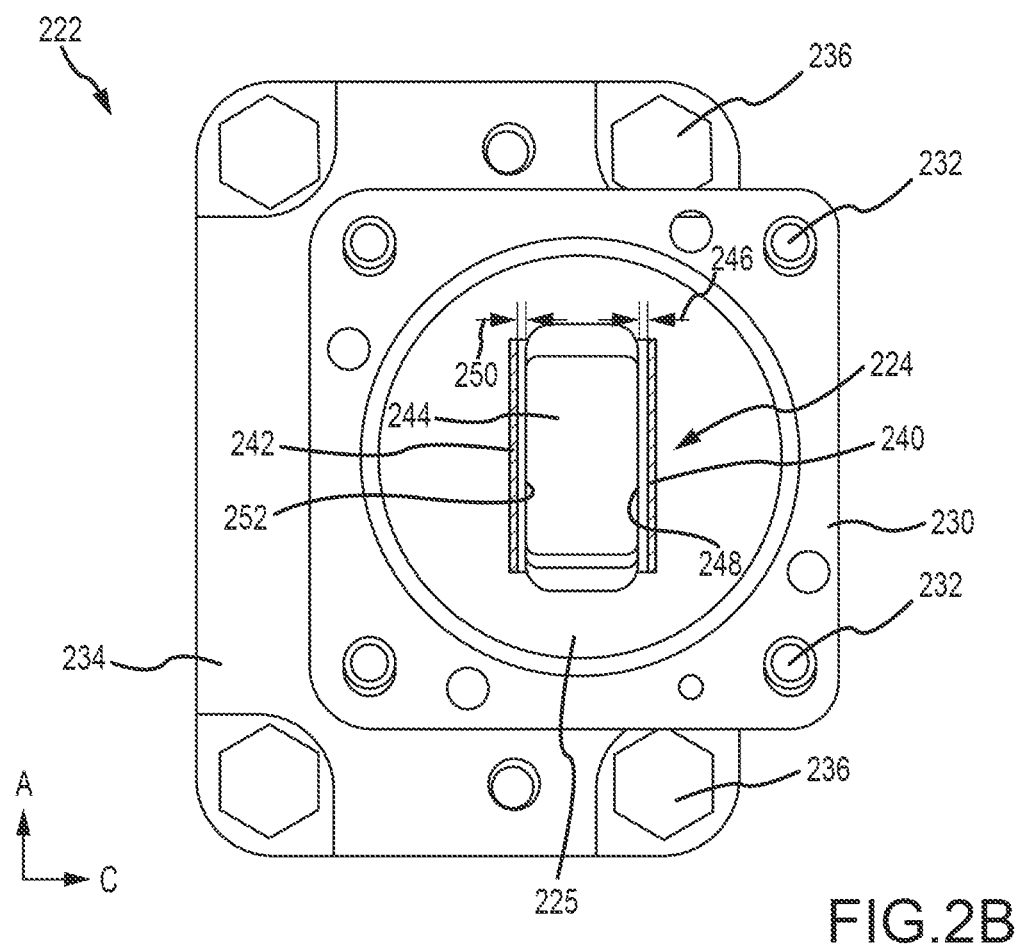

Referring now to FIGS. 2A and 2B, a mounting assembly 222 configured to mount an auxiliary component, such as, for example, a gearbox to an engine case (e.g., for mounting the gearbox 120 to the engine case 110) is illustrated. For reference, coordinate systems indicating a circumferential direction C, an axial direction A and a radial direction R are provided, with the coordinate systems indicating an orientation of the mounting assembly 222 with respect to the engine case and to the auxiliary component when assembled; the axial direction A is assumed parallel to the central rotational axis A, as illustrated in FIGS. 1A and 1B. The mounting assembly 222 includes a mechanical fuse 224 configured to shear during the occurrence of an overload event, with the overload event typically resulting in a load applied to the mechanical fuse 224 in the circumferential direction C. In various embodiments, the mounting assembly 222 includes a first flange 230 (or an upper flange) configured for attaching the mounting assembly 222 to an engine case (e.g., the engine case 110) via a first plurality of bolts 232. Similarly, the mounting assembly 222 includes a second flange 234 (or a lower flange) configured for attaching the mounting assembly 222 to the engine case (e.g., the engine case 110) via a second plurality of bolts 236. As detailed further below, the mechanical fuse 224 includes a first fuse member 240 and a second fuse member 242 disposed on either side of a center portion 244 (sometimes referred to as a catch pin). In various embodiments, the first fuse member 240 is spaced a first lateral distance 246 (or a first circumferential distance) from a first lateral side 248 of the center portion 244 and the second fuse member 242 is spaced a second lateral distance 250 (or a second circumferential distance) from a second lateral side 252 of the center portion 244.

Figure 3:
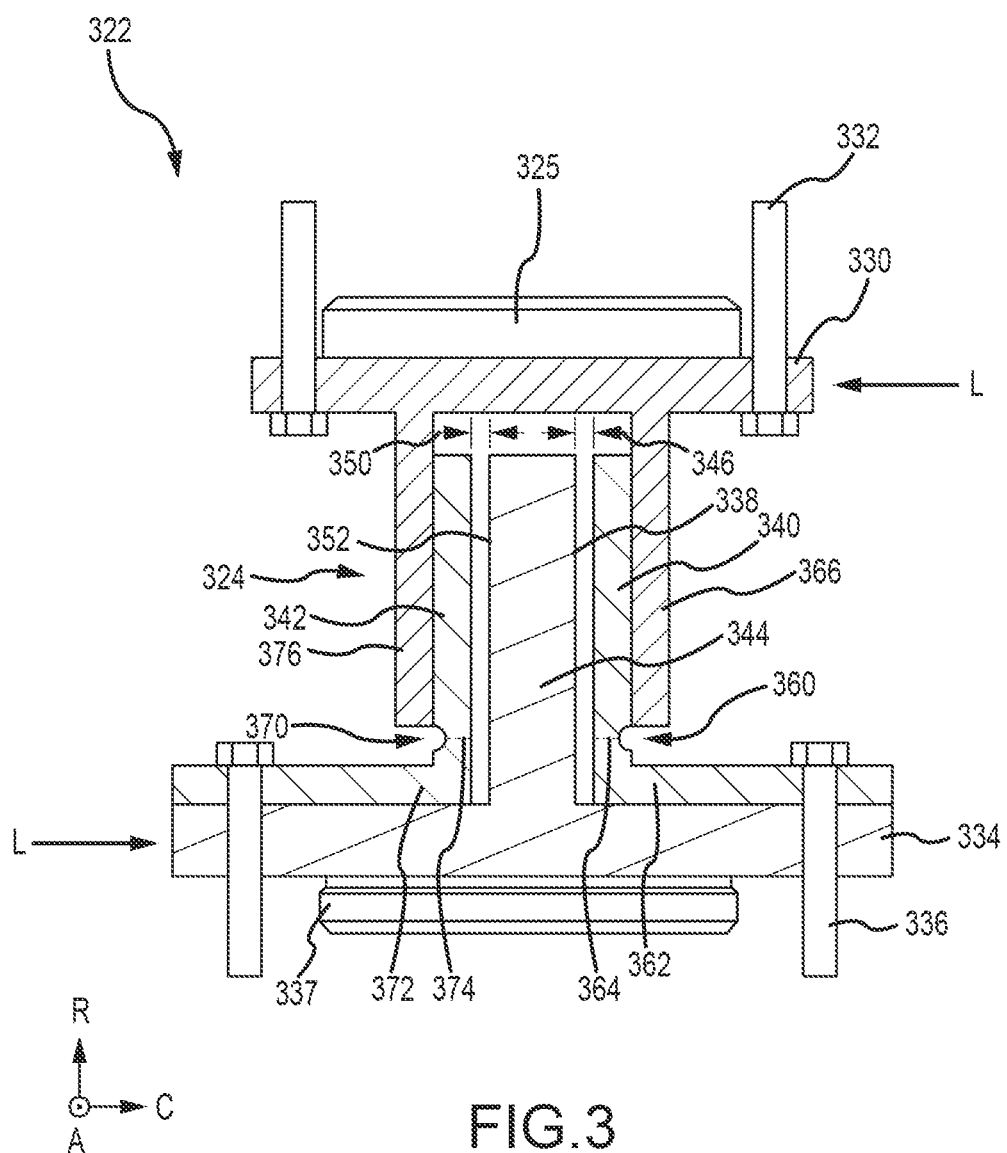
FIG. 3 provides a schematic cross-sectional view of a mounting assembly having a mechanical fuse, in accordance with various embodiments.

Referring now to FIG. 3, a schematic illustration of a mounting assembly 322 having a mechanical fuse 324 is illustrated, in accordance with various embodiments. For reference, a coordinate system indicating a circumferential direction C, an axial direction A and a radial direction R is provided, with the coordinate system indicating an orientation of the mounting assembly 322 with respect to an engine case and to an auxiliary component when assembled; the axial direction A is assumed parallel to the central rotational axis A, as illustrated in FIGS. 1A and 1B. In various embodiments, the mechanical fuse 324 is configured to shear during an overload event, with the overload event typically resulting in a load L applied to the mechanical fuse 324, with the load L typically applied in the circumferential direction C. In various embodiments, the mounting assembly 322 includes a first flange 330 (or an upper flange) configured for attaching the mounting assembly 322 to an engine case (e.g., the engine case 110) via a first plurality of bolts 332 and a boss 325 extending into a first recess portion of a mounting plate attached to the engine case. Similarly, the mounting assembly 322 includes a second flange 334 (or a lower flange) configured for attaching the mounting assembly 322 to the engine case (e.g., the engine case 110) via a second plurality of bolts 336. The mechanical fuse 324 includes a first fuse member 340 and a second fuse member 342 disposed on either side of a center portion 344 (sometimes referred to as a catch pin). In various embodiments, the first fuse member 340 is spaced a first lateral distance 346 (or a first circumferential distance) from a first lateral side 348 of the center portion 344 and the second fuse member 342 is spaced a second lateral distance 350 (or a second circumferential distance) from a second lateral side 352 of the center portion 344.

In various embodiments, the center portion 344 defines a rectangular block of material attached to the second flange and bounded by the first lateral side 348 and the second lateral side 352, with the rectangular block of material extending in the radial direction R from the second flange 334 and toward the first flange 330. The mechanical fuse 324 includes a first lateral gap 360 (or first axially extending gap) positioned proximate a first base portion 362 that is itself connected to the first fuse member 340. The first lateral gap 360 is formed as a cutout portion that extends in the circumferential direction C into the first fuse member 340 and that extends in the axial direction A along an axial length of the first fuse member 340 and results in formation of a first fuse section 364 that provides a first localized region (or a first localized region of relative weakness in shear) designed to fracture during an overload event, such as a FBO, where the overload is typically applied to the mechanical fuse 324 in the circumferential direction C with respect to the central rotational axis A. In addition, the mechanical fuse 324 includes a second lateral gap 370 (or second axial extending gap) positioned proximate a second base portion 372 that is itself connected to the second fuse member 342. The second lateral gap 370 is formed as a cutout portion that extends in the circumferential direction C into the second fuse member 342 and that extends in the axial direction A along an axial length of the second fuse member 342 and results in formation of a second fuse section 374 that provides a second localized region (or a second localized region of relative weakness in shear) designed to fracture during the overload event, such as the FBO, where the overload is typically applied to the mechanical fuse 324 in the circumferential direction C with respect to the central rotational axis A. In various embodiments, the first fuse member 340 and the second fuse member 342 extend in the radial direction R, respectively, from the first base portion 362 and the second base portion 372 toward the first flange 330.

Still referring to FIG. 3, the first fuse member 340 abuts a first wall member 366 that is connected to the first flange 330 and the second fuse member 342 abuts a second wall member 376 that is also connected to the first flange 330. In various embodiments, the first wall member 366 and the second wall member 376 extend in the radial direction R from the first flange 330 toward the second flange 334. During operation (e.g., during an overload event), the load L is applied to the first flange L in the direction indicated by the arrow indicating the load L (typically in the circumferential direction C with respect to the central rotational axis A illustrated in FIGS. 1A and 1B). An equal and opposite load L is applied to the second flange 334. The load L is transmitted via the first wall member 366 and the second wall member 376 into the first fuse member 340 and the second fuse member 342, resulting in fracture of the first fuse section 364 and the second fuse section 374 and absorption of energy resulting from the overload event. Once the first fuse section 364 and the second fuse section 374 fracture, the center portion 344 is able to move back and forth in the lateral direction (e.g., the circumferential direction C with respect to the central rotational axis A) with respect to the engine case to permit continued absorption of energy following the overload event. In various embodiments, the combined cross-sectional area of the first fuse section 364 and the second fuse section 374 is determined based on an ultimate strength calculated to be less than a predicted load expected during the overload event. As an example, the combined cross-sectional area of the first fuse section 364 and the second fuse section 374 may be determined using the criteria P/A=Ultimate Strength of both the first fuse section 364 and the second fuse section 374, where P is equal to 75% of the predicted overload and A is equal to the combined cross-sectional area of the first fuse section 364 and the second fuse section 374. In various embodiments, the first fuse section 364 and the second fuse section 374 have a dimension in the circumferential direction C that is less than or equal to, respectively, one-half to three-quarters of an otherwise nominal thickness of the first wall member 366 and the second wall member 376 in the circumferential direction C.

Various benefits of the foregoing disclosure may be realized. For example, the various embodiments described above are based around assemblies that simplify construction of the mechanical fuses and reduce the cost of their manufacture. The various embodiments also provide a manner to maintain the positioning of the gearbox or other auxiliary component relative to the engine case by limiting movement to a single direction (e.g., the circumferential direction with respect to the engine case) following an overload event. In other words, the various embodiments provide a manner of maintaining the auxiliary component in its proper position and orientation following an overload event. The various embodiments are also well-suited for use in locations having limited space and are also amenable to various manner of fabrication, including machining or additive manufacturing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above-described concepts can be used alone or in combination with any of or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A mounting assembly for mounting an auxiliary component to an engine case of a gas turbine engine, the engine case extending along an axial direction with respect to a central rotational axis of the gas turbine engine and extending along a lateral direction with respect to the central rotational axis of the gas turbine engine, comprising:
   a first flange configured for attaching the mounting assembly to the engine case;
   a second flange configured for attaching the mounting assembly to the auxiliary component; and
   a mechanical fuse disposed between the first flange and the second flange and configured to shear during an overload event, the mechanical fuse includes:
      a center portion connected to the second flange and extending away from the second flange and toward the first flange, the center portion defines a rectangular block bounded by a first lateral side and a second lateral side;

a first fuse member spaced a first lateral distance from the first lateral side; and a second fuse member spaced a second lateral distance from the second lateral side.

2. The mounting assembly of claim 1, wherein the mechanical fuse is configured to shear in reaction to a load applied in the lateral direction.

3. The mounting assembly of claim 1, wherein the mechanical fuse includes a first wall member connected to the first flange and extending away from the first flange and toward the second flange, the first wall member configured to abut the first fuse member.

4. The mounting assembly of claim 3, wherein the mechanical fuse includes a second wall member connected to the first flange and extending away from the first flange and toward the second flange, the second wall member configured to abut the second fuse member.

5. The mounting assembly of claim 4, wherein the first fuse member includes a first fuse section, the first fuse section being formed by a first lateral gap positioned proximate a first base portion that is connected to the first fuse member.

6. The mounting assembly of claim 5, wherein the second fuse member includes a second fuse section, the second fuse section being formed by a second lateral gap positioned proximate a second base portion that is connected to the second fuse member.

7. The mounting assembly of claim 6, wherein a first boss is connected to the first flange and configured to be received in a first recess portion of a plate attached to the engine case.

8. The mounting assembly of claim 7, wherein a second boss is connected to the second flange and configured to be received in a second recess portion extending into the auxiliary component.

9. A gas turbine engine, comprising:

an engine case, the engine case including a plate for mounting a gearbox; and a mounting assembly for mounting the gearbox to the engine case, the engine case extending along an axial direction with respect to a central rotational axis of the gas turbine engine, the mounting assembly including a first flange configured for attaching the mounting assembly to the engine case, a second flange configured for attaching the mounting assembly to the gearbox, and a mechanical fuse disposed between the first flange and the second flange and configured to shear during an overload event, the mechanical fuse includes:

a center portion connected to the second flange and extending away from the second flange and toward the first flange, the center portion defines a rectangular block bounded by a first lateral side and a second lateral side;

a first fuse member spaced a first lateral distance from the first lateral side; and a second fuse member spaced a second lateral distance from the second lateral side.

10. The gas turbine engine of claim 9, wherein the mechanical fuse is configured to shear in reaction to a load applied in a lateral direction, the lateral direction being a circumferential direction with respect to the axial direction.

11. The gas turbine engine of claim 9, wherein the mechanical fuse includes a first wall member connected to the first flange and extending away from the first flange and toward the second flange, the first wall member configured to abut the first fuse member, and a second wall member connected to the first flange and extending away from the first flange and toward the second flange, the second wall member configured to abut the second fuse member.

12. The gas turbine engine of claim 11, wherein the first fuse member includes a first fuse section, the first fuse section being formed by a first lateral gap positioned proximate a first base portion that is connected to the first fuse member, and a second fuse section, the second fuse section being formed by a second lateral gap positioned proximate a second base portion that is connected to the second fuse member.

13. The gas turbine engine of claim 12, wherein a first boss is connected to the first flange and configured to be received in a first recess portion of the plate attached to the engine case, and a second boss is connected to the second flange and configured to be received in a second recess portion extending into the gearbox.

* * * * *